US005644918A

United States Patent [19]

Gulati et al.

[11] Patent Number: 5,644,918

[45] Date of Patent: Jul. 8, 1997

[54] DYNAMICS FREE LOW EMISSIONS GAS TURBINE COMBUSTOR

[75] Inventors: Anil Gulati, Cincinnati, Ohio; Anthony John Dean, Scotia, N.Y.; David Graham Holmes, Schenectady, N.Y.; Eayre Bruce Voorhees, Sloansville, N.Y.

[73] Assignee: General Electric Company, Schenectady, N.Y.

[21] Appl. No.: 337,704

[22] Filed: Nov. 14, 1994

[51] Int. Cl.[6] .................. F02C 7/045

[52] U.S. Cl. .................. 60/725; 60/738; 431/114

[58] Field of Search .................. 60/725, 737, 746, 60/747, 752, 738; 181/213, 229, 286; 431/114

[56] References Cited

U.S. PATENT DOCUMENTS

| | | | |
|---|---|---|---|
| 3,359,737 | 12/1967 | Lewis | 60/725 |
| 3,483,698 | 12/1969 | Lewis et al. | 60/725 |
| 3,819,009 | 6/1974 | Motsinger | 181/286 |
| 4,122,674 | 10/1978 | Anderson et al. | 431/114 |
| 5,373,695 | 12/1994 | Aigner et al. | 60/725 |

OTHER PUBLICATIONS

Abbott A. Putnam, "Combustion–Driven Oscillations in Industry," American Elsevier Publishing Co., Inc., New York, 1971, pp. 156–175.

*Primary Examiner*—Louis J. Casaregola
*Attorney, Agent, or Firm*—Patrick K. Patnode; Marvin Snyder

[57] ABSTRACT

Combustion-induced instabilities are minimized in gas turbine combustors by incorporating one or more Helmholtz resonators into the combustor. First and second plates located in the head end of the combustor casing define one cavity, and a sleeve located between the casing and the liner defines another cavity. Each of the two cavities is connected to the combustion chamber by one or more throats, thus forming Helmholtz resonators. The throats of each resonator can be tubes of different lengths and/or different cross-sectional areas to provide dynamics suppression over a broad band of frequencies. The throats can also be arranged such that each throat is associated with a different portion of its respective cavity, each cavity portion having a different volume.

12 Claims, 2 Drawing Sheets

DYNAMICS FREE LOW EMISSIONS GAS TURBINE COMBUSTOR

BACKGROUND OF THE INVENTION

This invention relates generally to gas turbine combustors and more particularly concerns reducing combustion instabilities in dry low $NO_x$ gas turbine combustors.

Gas turbines generally include a compressor, one or more combustors, a fuel injection system and a turbine. Typically, the compressor pressurizes inlet air which is then reverse flowed to the combustors where it is used to provide air for the combustion process and also to cool the combustors. In a multi-combustor system, the combustors are located about the periphery of the gas turbine, and a transition duct connects the outlet end of each combustor with the inlet end of the turbine to deliver the hot products of combustion to the turbine.

Gas turbine combustors are being developed which employ lean premixed combustion to reduce emissions of gases such as $NO_x$. One such combustor comprises a plurality of premixers attached to a single combustion chamber. Each premixer includes a flow tube with a centrally-disposed fuel nozzle comprising a center hub which supports fuel injectors and swirl vanes. During operation, fuel is injected through the fuel injectors and mixes with the swirling air in the flow tube, and a flame is produced at the exit of the flow tube. The combustion flame is stabilized by a combination of bluffbody recirculation behind the center hub and swirl-induced recirculation. Because of the lean stoichiometry, lean premixed combustion achieves lower flame temperatures and thus produces lower $NO_x$ emissions.

Because of the turbulent nature of the combustion process and the large volumetric energy release in closed cavities, such combustors are susceptible to a wide range of modes and frequencies of combustion-induced unsteady pressure oscillations of large amplitudes. These pressure oscillations, referred to herein as "dynamics," can severely limit the combustor operating range and can even destroy combustor hardware. Methods to suppress combustor dynamics have traditionally worked upon de-coupling the excitation source from the feedback mechanism. Such means are generally only effective over a limited range of operation of the combustor.

Accordingly, there is a need for a low $NO_x$ combustor capable of achieving low dynamics over a wide range of operation.

SUMMARY OF THE INVENTION

The above-mentioned needs are met by the present invention which provides a gas turbine combustor having one or more Helmholtz resonators incorporated therein. The combustor comprises a casing having an upstream end and a downstream end and a liner defining a combustion chamber disposed within the casing. First and second plates located in the upstream end of the casing define one cavity, and a sleeve located between the casing and the liner defines another cavity. Each of the two cavities is connected to the combustion chamber by one or more throats, thus forming Helmholtz resonators. The throats can comprise tubes of different lengths and/or different cross-sectional areas to provide dynamics suppression over a broad band of frequencies. The throats can also be arranged such that each throat is associated with a different portion of its respective cavity, each cavity portion having a different volume.

By absorbing acoustic energy independent of its source, the Helmholtz resonators are able to provide low dynamics operation over a wide operating range. The present invention incorporates the Helmholtz resonators into available space within the combustor casing and without adversely affecting combustor performance.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
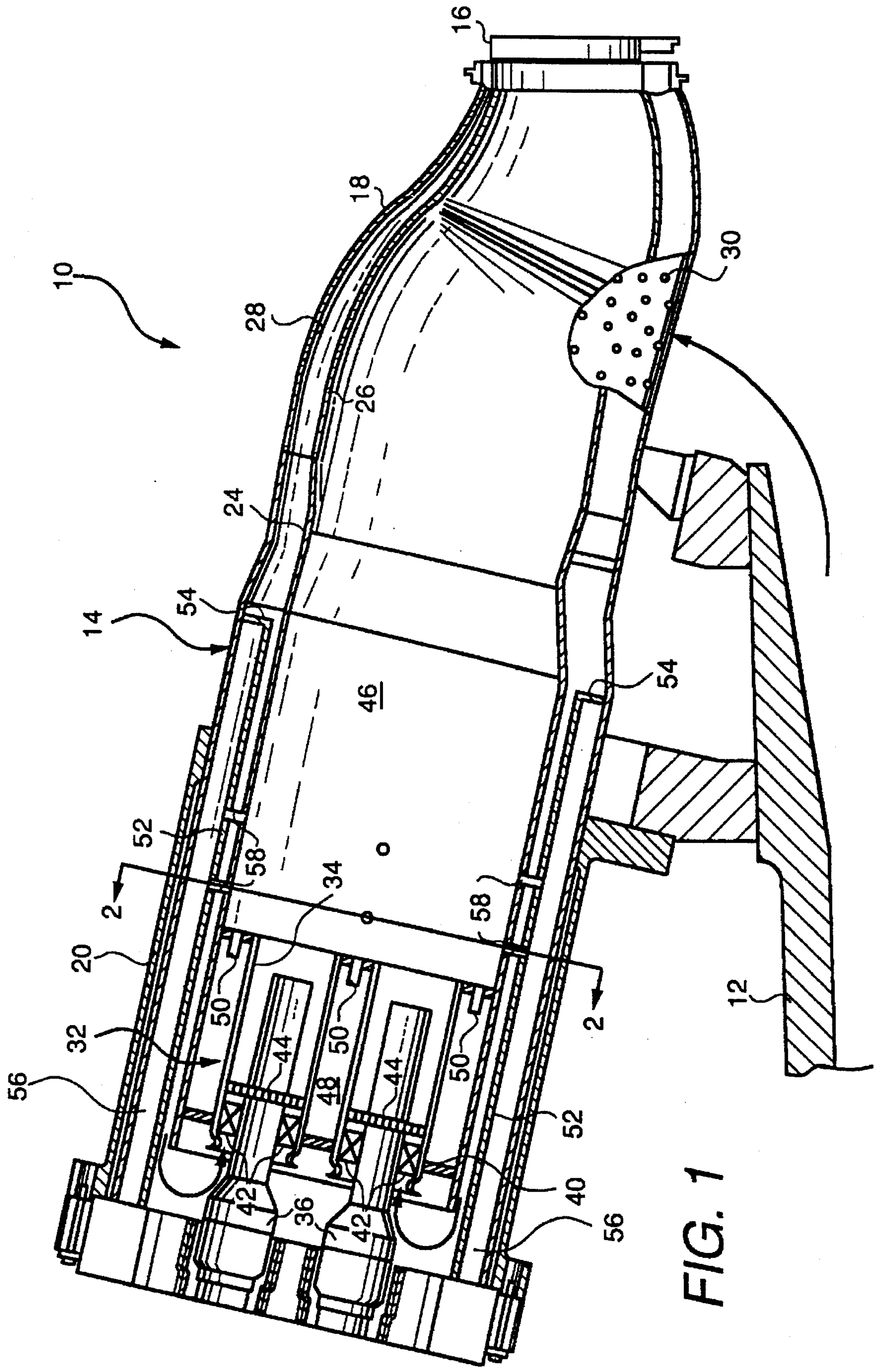
FIG. 1 is a partial cross-section through one combustor of a gas turbine in accordance with the present invention.
Figure 2:
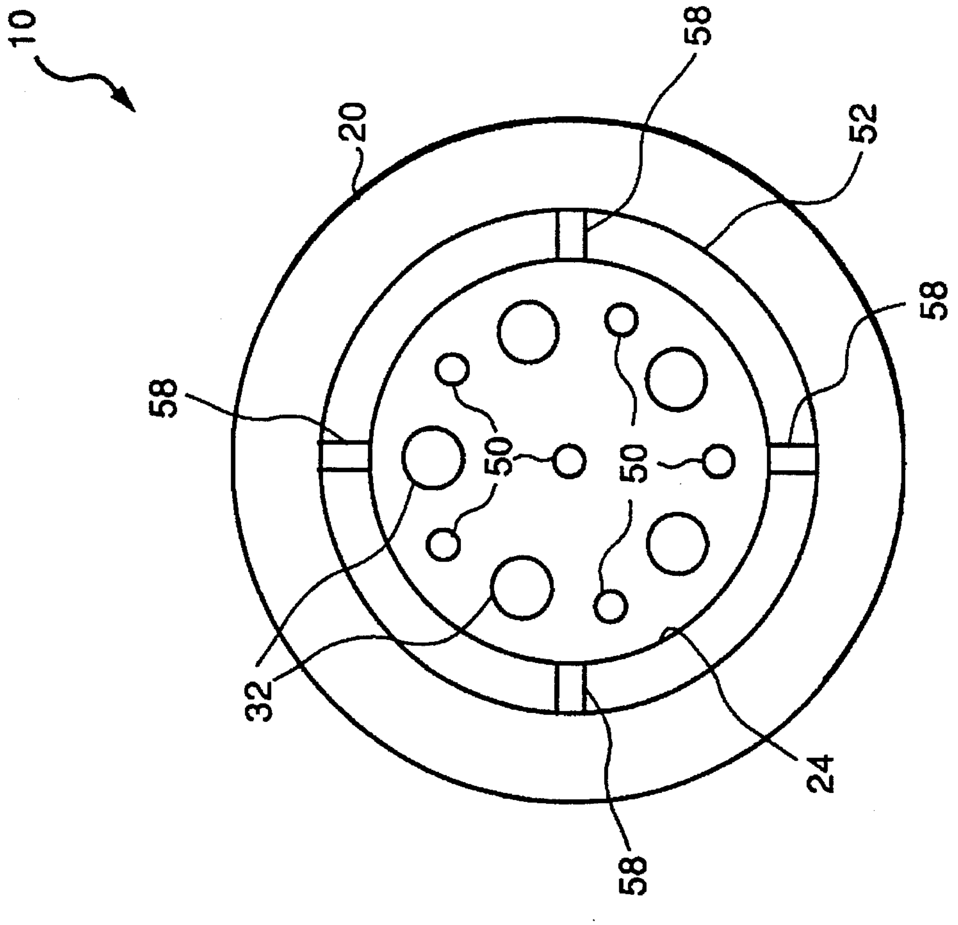
FIG. 2 is a cross-sectional view of the gas turbine combustor of the present invention taken along line 2—2 of FIG. 1.

Referring to the drawings wherein identical reference numerals denote the same elements throughout the various views, FIGS. 1 and 2 show a gas turbine 10 which includes a compressor 12 (partially shown), a plurality of combustors 14 (one shown for convenience and clarity), and a turbine 16 represented in the Figure by a single blade. Although not specifically shown, the turbine 16 is drivingly connected to the compressor 12 along a common axis. The compressor 12 pressurizes inlet air which is then reverse flowed to the combustor 14 where it is used to cool the combustor and to provide air to the combustion process. Although only one combustor 14 is shown, the gas turbine 10 includes a plurality of combustors 14 located about the periphery thereof. A double-walled transition duct 18 connects the outlet end of each combustor 14 with the inlet end of the turbine 16 to deliver the hot products of combustion to the turbine 16.

Each combustor 14 includes a substantially cylindrical combustion casing 20 having an upstream or head end and a downstream end. The head end of the combustion casing 20 is closed by an end cover assembly 22 which may include conventional supply tubes, manifolds and associated valves for feeding gas, liquid fuel, etc. to the combustor 14. Within the combustion casing 20, there is a concentrically arranged combustion liner 24 which is connected at its forward end with the inner wall 26 of the transition duct 18. The outer wall 28 of the transition duct 18 is provided with an array of apertures 30 over its peripheral surface to permit air to reverse flow from the compressor 12 through the apertures 30, into an annular space between the casing 20 and the liner 24, and to the upstream or head end of the combustor 14 (as indicated by the flow arrows shown in FIG. 1).

A plurality of premixers 32 is located in the upstream end of the casing 20. As seen in FIG. 2, five premixers 32 are arranged in a circular array about a longitudinal axis of the combustor 14, but the present invention is not limited to this number of premixers. Each premixer 32 comprises a flow tube 34 and a fuel nozzle assembly 36. The fuel nozzle assemblies 36 are supported by the end cap assembly 22, and the flow tubes 34 are supported at their forward and rearward ends by front and rear mounting plates 38, 40, respectively.

The flow tubes 34 are positioned so that the forward sections of the corresponding fuel nozzle assemblies 36 are concentrically disposed therein. Each premixer 32 includes an annular air swirler 42 mounted in surrounding relation with the respective fuel nozzle assembly 36. Radial fuel injectors 44 are provided downstream of each swirler 42 for discharging fuel into a premixing zone located within each flow tube 34. The arrangement is such that air flowing in the annular space between the liner 24 and the casing 20 is forced to again reverse direction in the head end of the combustor 14 and to flow through the premixers 32 before entering a combustion chamber 46 defined by the liner 24, downstream of the premixers 32.

The combustor 14 of the present invention includes two Helmholtz resonators for suppressing dynamics: a "head end" resonator incorporated into the space available around the premixers 32 in the head end of the combustor 14 and a "side-mounted" resonator incorporated into a space between the casing 20 and the combustion liner 24. A Helmholtz resonator generally comprises a large volume connected to a space in which oscillations are to be suppressed by a throat. The resonator volume of the "head end" resonator is formed by a cavity 48 which is defined by the front and rear mounting plates 38, 40 and the inside of the liner 24. The cavity 48 represents space which typically does not serve any particular use in conventional combustors.

The cavity 48 is connected to the combustion chamber 46 by a plurality of throats 50 formed in the front plate 38. The front and rear mounting plates 38, 40 fit tightly in contact with the liner 24 and with the premixers 32 so that the cavity 48 is a substantially closed cavity through which the premixers 32 extend, the only openings being the throats 50. The throats 50 can comprise tubes extending through the front plate 38 or can simply be openings formed therein. As seen in FIG. 2, the throats 50 are preferably evenly placed about the premixers 32.

The "side-mounted" resonator is formed by a cylindrical sleeve 52 located concentrically between the combustion casing 20 and the liner 24. An annular ring or flange 54 extends radially between the downstream end of the sleeve 52 and the inner surface of the casing 20. A substantially closed annular cavity 56 is thus formed between the casing 20 and the sleeve 52. The cavity 56 functions as the resonator volume of the "side-mounted" resonator and is connected to the combustion chamber 46 by a plurality of throats 58. The throats 58 are preferably arranged in circumferential manner and can be divided into a number of groups, each group being at a different axial location. Each throat 58 preferably comprises a tube extending between an opening in the liner 24 and an opening in the sleeve 52. The addition of the sleeve 52 to form the cavity 56 should have no deleterious effect on the performance of the combustor because there is no mean throughflow in the cavity 56 except for a minimal flow which may be required to prevent runaway temperatures in the resonator.

As described above, the head end and side-mounted resonators both preferably have multiple throats. Thus, both resonators can be viewed as a collection of multiple single-throat resonators in which the resonator volume is a portion of the cavity 48 or 56. That is, each throat 50 of the head end resonator is associated with a respective portion of the cavity 48, and each throat 58 of the side-mounted resonator is associated with a respective portion of the cavity 56. It is well known that Helmholtz resonators suppress the transmission of pressure oscillations at frequencies given by the equation:

$$f=\frac{c}{2\pi}\sqrt{\frac{A}{lV}}$$

where c is the speed of sound in the resonator volume, A is the cross-sectional area of the throat, 1 is the length of the throat and V is the resonator volume. Thus, by arranging the throats 50, 58 so that their associated cavity portions are of different volumes, dynamics suppression over a broad band of frequencies can be achieved. Alternatively, the resonators of the present invention will be effective over a broad band of frequencies if their multiple throats have different diameters and/or different lengths.

Although the combustor 14 of the present invention has been described as having both a head end resonator and a side-mounted resonator, it should be noted that these resonators are independent of one another. Thus, either resonator could be used alone in a combustor to suppress dynamics.

The foregoing has described a gas turbine combustor which incorporates one or more Helmholtz resonators in various forms to produce dynamics free operation. While specific embodiments of the present invention have been described, it will be apparent to those skilled in the art that various modifications thereto can be made without departing from the spirit and scope of the invention as defined in the appended claims.

What is claimed is:

1. A gas turbine combustor comprising:

a casing having an upstream end and a downstream end;

a liner disposed in said casing, said liner defining a combustion chamber;

a head end Helmholtz resonator defined by a first plate and second plate located in the upstream end of said casing, said first and second plates and said liner defining a first substantially closed cavity and at least one head end resonator tube connecting said first cavity and said combustion chamber; and a side-mounted Helmholtz resonator defined by a sleeve located between said casing and said liner, said sleeve and said casing defining a second substantially closed cavity and at least one side-mounted resonator tribe connecting said second cavity and said combustion chamber.

2. A gas turbine combustor in accordance with claim 1, further comprising a plurality of head end resonator tubes connecting said first cavity and said combustion chamber.

3. A gas turbine combustor in accordance with claim 2 wherein said head end resonator tubes are mounted in one of said first and second plates.

4. A gas turbine combustor in accordance with claim 2 wherein said head end resonator tubes have different lengths.

5. A gas turbine combustor in accordance with claim 2 wherein said head end resonator tubes have different cross-sectional areas.

6. A gas turbine combustor in accordance with claim 2 wherein said head end resonator tubes are arranged such that each head end resonator tube is associated with a different portion of said first cavity, each portion of said first cavity having a different volume.

7. A gas turbine combustor in accordance with claim 1 further comprises a plurality of side mounted resonator tubes connecting said second cavity and said combustion chamber.

8. A gas turbine combustor in accordance with claim 7 wherein said side-mounted tubes are divided into at least two groups, each group being at a different axial location.

9. A gas turbine combustor in accordance with claim 7 wherein each one of said side-mounted tubes comprises an opening in said liner, an opening in said sleeve and a tube extending between said openings.

10. A gas turbine combustor in accordance with claim 7 wherein said side-mounted resonator tubes have different lengths.

11. A gas turbine combustor in accordance with claim 7 wherein said side-mounted resonator tubes have different cross-sectional areas.

12. A gas turbine combustor in accordance with claim 7 wherein said side-mounted resonator tubes are arranged such that each side-mounted resonator tube is associated with a different portion of said first cavity, each portion of said first cavity having a different volume.

* * * * *